(12) United States Patent
Shouji et al.

(10) Patent No.: US 6,431,473 B2
(45) Date of Patent: *Aug. 13, 2002

(54) FUEL INJECTION VALVE COATED WITH ANTI-FOULING PERFLUOROPOLYETHER FILM LAYER AND ASSOCIATED METHOD, AND DIRECT INJECTION ENGINE USING SAME

(75) Inventors: Mitsuyoshi Shouji, Juou-machi; Hiroshi Sasaki, Tokai-mura; Kenichi Kawashima, Hitachinaka; Yutaka Ito, Takahagi; Yoshiyuki Tanabe, Hitachinaka; Atsushi Sekine, Mito, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/887,110

(22) Filed: Jun. 25, 2001

Related U.S. Application Data (63) Continuation of application No. 09/300,523, filed on Apr. 28, 1999, now Pat. No. 6,273,348.

(30) Foreign Application Priority Data

Apr. 28, 1998 (JP) ............................................. 10-118177

(51) Int. Cl.[7] .............................................. F02M 37/10
(52) U.S. Cl. ..................................... 239/585.1; 123/305
(58) Field of Search ....................... 123/305; 239/585.1; 427/446, 447, 109, 110, 236, 237

(56) References Cited

U.S. PATENT DOCUMENTS

| | | | | |
|---|---|---|---|---|
| 4,784,178 A | * | 11/1988 | Kasaya et al. | ............... 123/305 |
| 5,037,031 A | * | 8/1991 | Campbell et al. | ......... 239/533.3 |
| 5,716,001 A | * | 2/1998 | Wakeman et al. | .......... 239/584 |
| 5,716,665 A | * | 2/1998 | Vita et al. | ................... 427/119 |
| 6,071,564 A | * | 6/2000 | Marchetti et al. | ........ 427/208.2 |
| 6,273,348 B1 | * | 8/2001 | Shouji et al. | ............. 239/585.1 |

FOREIGN PATENT DOCUMENTS

| | | | | |
|---|---|---|---|---|
| DE | 19919413 | * | 11/1999 | |
| FR | 2 766 239 A1 | * | 1/1999 | .......... F02M/61/10 |
| JP | 55-90076 A | * | 7/1980 | ............ H01M/6/06 |
| JP | 55-116875 | | 9/1980 | |
| JP | 56-25067 | | 3/1981 | |
| JP | 7-246365 | | 9/1995 | |
| JP | 9-264232 | | 10/1997 | |
| JP | 10-159687 | | 6/1998 | |
| JP | 10274134 | * | 10/1998 | |

OTHER PUBLICATIONS

Masao Kinoshita et al., "Study of Nozzle Deposit Formation Mechanism for Direct Injection Gasoline Engines", Oct. 1997, pp. 21–24.

* cited by examiner

Primary Examiner—John Kwon
Assistant Examiner—Hieu T. Vo
(74) Attorney, Agent, or Firm—Crowell & Moring LLP (57) ABSTRACT

The invention provides for a fuel injection valve for a direct gasoline injection engine, a direct injection engine and an automobile using the same, which can prevent the deposits produced during combustion of gasoline from accumulating on the surface of the fuel injection valve, or easily remove the deposits therefrom. A reaction-bonded layer of perfluoropolyether compounds having alkoxy silane as its terminal group is provided on the surface of the fuel injection valve of the invention.

2 Claims, 7 Drawing Sheets

FUEL INJECTION VALVE COATED WITH ANTI-FOULING PERFLUOROPOLYETHER FILM LAYER AND ASSOCIATED METHOD, AND DIRECT INJECTION ENGINE USING SAME

CROSS-REFERENCE TO RELATED APPLICATION

This application is a continuation of application Ser. No. 09/300,523, filed Apr. 28, 1999, now U.S. Pat. No. 6,273,348 B1, issued Aug. 14, 2001, which is incorporated herein its entirety by reference.

FIELD OF THE INVENTION

The present invention relates to a novel fuel injection valve for a direct injection engine, and in particular, it relates to a fuel injection valve and a direct injection type engine using the same for an automobile.

DESCRIPTION OF RELATED ART

A gasoline direct injection engine is comprised of a cylinder block, a piston having a piston ring, which is inserted in the cylinder block, and a cylinder head which is in the upper portion of the cylinder block. A combustion chamber is formed in a space surrounded by an internal wall of the cylinder block, an upper surface of the piston and a bottom surface of the cylinder head. Substantially in the center portion of the cylinder head, there is mounted an ignition plug. An air-intake valve and an exhaust valve are provided near the ignition plug. In addition, a fuel injection valve 1 is provided for directly injecting fuel into the combustion chamber. Atomized fuel injected from the fuel injection valve 1 impinges on a concave surface at the top of the piston to be reflected and guided toward the vicinity of the ignition plug which is substantially in the center portion of the cylinder head, whereby realizing a stratified lean burn combustion is realized.

The fuel injection valve of the gasoline direct injection engine, which is installed within the engine cylinder, is exposed to a high temperature combustion gas. In this condition, deposits produced by combustion of gasoline tend easily to accumulate on the tip of the fuel injection valve, thereby distorting a fuel atomization pattern specified to take place within the engine cylinder, consequently resulting in a decrease of its fuel flow rate, and deterioration of a fuel-air mixture, thereby causing its combustion to become very unstable. A cause of the deposits is considered to be due to accumulation of soot produced in the combustion chamber, and a gumlike substance produced by thermal decomposition of gasoline. In particular, when the temperature in the circumference of the fuel injection valve is higher than 160° C., the deposits are reported to be easily accumulated. Several methods have been tried for cleaning such deposits by mixing additives into gasoline or by reducing the coarseness of the surface of the fuel injection valve (Jidosha-gijyutsu-kai; symposium preprint 976 (1997-10)). Further, many attempts have been made to drop the temperature of the tip end of the injection valve as disclosed in JPA Laid-Open No. 9-264232. However, it has been difficult by any of these attempts effectively to reduce the deposits. JPA Laid-Open No.9-264232 discloses that the surface of the fuel injection valve is made oleophobic so as to be able easily to remove the deposits, and prevent the decrease of fuel flow. According to this method, a fluoroalkyl compound is reaction-bonded on the surface of the fuel injection valve so as to make its surface oleophobic. Still further, according to JPA Laid-Open No. 7-246365, it is disclosed that the surface of the fuel injection valve is treated by a sol-gel method using a mixture solution of a metal alkoxide and a fluoroalkyl group substituted metal alkoxide which is prepared by substituting a part of alkoxyl group with a fluoroalkyl group, thereby making the surface of the fuel injection valve oleophobic such that the deposits can be easily removed and the decrease in the fuel flow can be prevented. This method includes such one whereby a mixture solution of a fluoroalkyl group substituted metal alkoxid compound and a metal alkoxide is reaction-bonded on the surface of the fuel injection valve so as to make its surface oleophobic, and such ones to form various films as disclosed in JUP Nos.55-116875 and 56-25067. However, these methods are accompanied with a problem to be solved that when the temperature at the tip end of the fuel injection valve exceeds a point at which 90% of the fuel used evaporates, accumulation of deposits progresses on the fuel injection valve so as to reduce the area of opening of the fuel injection valve's port, thereby decreasing the flow rate of the fuel.

SUMMARY OF THE INVENTION

The cause of the production of the deposits is considered, as described in JPA Laid-Open No.9-264232, to be that high residual components in the fuel tend to remain on the surface of the fuel injection valve, and its residual as a core causes subsequent dehydrogenation and polymerization reactions. The prior art method of reaction-bonding the fluoroalkyl compound on the surface of the fuel injection valve so as to be able easily to peel off the deposits is involved with the problem that when the temperature at the tip end of the fuel injection valve is raised as high as to increase the production of the deposits, its effect is reduced.

Further, the method disclosed in JPA Laid-Open No.7-246365 whereby the mixture of the metal alkoxide and the fluoroalkyl group substituted metal alkoxide was baked on the surface of the fuel injection valve so as to render the surface of the injection valve oleophobic thereby improving its deposit peel-off capability, is associated with a problem that when the temperature at the tip end of the injection valve is raised and the production of the deposits increases accordingly, its overall effect is reduced. This cause is considered, as discussed in JPA Laid-Open No.10-159687, to be that the provision of the oleophobic property was insufficient to realize its designed function. Still further, it is necessary for this oleophobic property to exist stably in conditions of a high fuel pressure, high combustion pressure, and high surface temperatures of 150 to 200° C. on the surface of the injection valve.

In order to solve the problems associated with the prior art, it is contemplated effective to coat the surface of the fuel injection valve with a fluorine film having a low surface energy, or to reaction-bond a thick film thereon using a fluorine compound having a long chain according to the invention. By provision of such coating or film, the deposits thereon can be cleaned out easily by the fuel of gasoline thereby advantageously preventing adhesion of the deposits thereon. If this object of the invention is realized, a stable combustion pattern designated for a highly reliable gasoline direct injection engine can be achieved. In order to accomplish the object of the invention, there are the following problems to be solved.

A material suitable for this object must be able to exist stably on the surface of the fuel injection valve under conditions of 5–12 MPa of fuel pressures, and 150–200° C. of temperatures on the surface of the fuel injection valve, and in addition, must be able to provide a low surface energy with the oleophobic property. Here, the stability (to exist stably) refers to that the material must be nonflammable even if in an environment exposed to the combustion of gasoline for a long time, therefore requiring a high oxidation stability, thermal stability, and gasoline stability, as well as a high adhesion to the surface of the fuel injection valve. Thereby, these problems must have been solved.

The object of the invention is to provide for a fuel injection valve for use in a gasoline direct injection engine, a gasoline direct injection engine and an automobile using the same, which can prevent the deposit produced in the combustion of gasoline to settle on the surface of the injection valve thereof, or which can easily remove the deposits attached thereon.

According to the feature of the invention, a fuel injection valve suitable for use in a gasoline direct injection engine is provided, which can prevent adhesion of the deposit produced in the combustion of gasoline on the surface of the injection valve, and/or easily remove the deposit adhered thereto.

A material of a deposit-resistant film on the surface of the fuel injection valve suitable for use in a gasoline direct injection engine must be such one which can stably exist on the surface of the injection valve which is exposed to an environment of 5–12 MPa of fuel pressure, 150–200° C. of temperatures on the surface of the valve under combustion of gasoline, and in addition, which can provide a low surface energy as well as a strong adhesion to the injection valve under such environment.

A surface modifying reagent for forming the deposit-resistant film in order for the same to be used in the aforementioned environment, must be essentially nonflammable thereby limiting its materials to be used. An organic compound which can withstand the above-mentioned environment is preferably a perfluoro compound. This compound is most preferable as a material which can provide for a low surface energy, and is also preferable in the terms of oxidation stability, thermal stability and gasoline resistant stability as well. However, because of its low surface energy, the perfluoro compound has a weak adhesion with a substrate. Hence, it becomes necessary to provide for a compound which has a group to combine with the terminal of the perfluoro compound which bonds with the substrate by reaction. Further, the length of molecular chain in the fluoroalkyl compound used in the prior art is as small as 1 nm or less, therefore, when the deposit is pressed against the surface of the injection valve under the fuel pressure of 5–12 MPa, the deposit is easily caused to pierce through 1 nm thick film of perfluoroalkyl compound to get directly in contact with the surface body to bond therewith. In order to solve this problem, it is contemplated according to the invention that if a thick film of a fluorine compound having a long chain is provided, the adhesion of the deposit can be prevented. However, because the number of carbon in the perfluoro alkyl compounds is generally from 14 to 16 in maximum, it is difficult to synthesize its compound having an increased polymerization.

Hence, we noted to use a polymer of a perfluoropolyether compound as a candidate material which can be stably used in the above-mentioned environment. This perfluoropolyether compound is an average number of molecule weights from 2000 to 8000, and a shape of the compound is looklike yarn ball of more than 1.5 nm in average size (2×radius of molecule rotation). Then, if a dense film of coating of a perfluoropolyether compound can be formed, the surface of the fuel injection valve can be coated 1.5 nm thick or more in average. Because the surface of the yarn ball of the above-mentioned perfluoropolyether compound is covered by fluorine atoms, it has a low surface energy, thereby preventing adhesion of the deposits, or facilitating peel-off of the deposits. Further, when subjected to an external mechanical pressure, the above-mentioned yarn ball is considered to function as a buffer film. According to this effect, even if the deposit is pressed against the surface of the fuel injection valve at pressures of 5–12 MPa of the fuel, the deposit is considered not to penetrate through the coating of perfluoropolyether compound, thereby preventing its adhesion on the surface of the injection valve. In order for this perfluoropolyether compound to be strongly bonded on the substrate, a most general method will be to provide for alkoxy silane bonded to its terminal.

BRIEF DESCRIPTION OF THE DRAWINGS

These and other objects, aspects and embodiments of the present invention will be described in more detail with reference to the following drawings, in which.

DESCRIPTION OF NUMERALS 1, 47 . . . fuel injection valve; 2 . . . fuel injection valve drive circuit; 3, 48 . . . ignition plug; 4, 46 . . . intake valve; 5, 50 . . . exhaust valve; 6 . . . intake port; 7 . . . exhaust port; 8, 45 . . . piston; 9 . . . electronic control unit; 10 . . . cylinder head; 11 . . . injection valve drive signal terminal; 12, 42 . . . three-way catalyst; 13 . . . NOx catalyst; 14 . . . combustion chamber; 22 . . . housing; 23 . . . core; 25 . . . coil; 26 . . . armature; 27 . . . valve unit; 29 . . . valve body; 31 . . . fuel injection port; 32 . . . valve sheet; 33 . . . needle valve; 35 . . . swirler; 40 . . . throttle actuator; 49 . . . intake flow sensor.

DETAILED DESCRIPTION OF THE INVENTION

The present invention provides for a fuel injection valve suitable for use in a gasoline direct injection engine, wherein the surface of the fuel injection valve is coated by reaction-bonding with a perfluoropolyether group compound having alkoxy silane at its terminal, or with a perfluoropolyether compound which is reaction-bonded via an adhesion promotion layer so as to provide for a low surface energy to the fuel injection valve for the gasoline direct injection engine, thereby preventing the deposit from accumulating on the surface of the fuel injection valve or easily removing the deposit having been attached therefrom.

Specific chain structures of such perfluoropolyether compounds may include the following formulas such as KRYTOX available from E.I. du Pont de Nemours & Co. (Inc.), DEMNUM from DAIKIN INDUSTRIES, LTD., and FOMBLIN from AUSIMONT, LTD.

$$\text{KRYTOX: } F(CF(CF_3)\text{—}CF_2\text{—}O\text{—})_n\text{—} \tag{Comp.3}$$

$$\text{DEMNUM: } F(CF_2\text{—}CF_2\text{—}CF_2\text{—}O)_n\text{—} \tag{Comp.4}$$

$$\text{FOMBLIN: } F(CF_2\text{—}CF_2\text{—}O)_x(\text{—}CF_2\text{—}O\text{—})\text{—}_y \tag{Comp.5}$$

$$\text{or } \text{—}\{(CF_2\text{—}CF_2\text{—}O\text{—})_x\text{—}(\text{—}CF_2\text{—}O\text{—})_y\text{—}\}\text{—},$$

wherein $n \geq 12$ (integer), $x+y \geq 28$, and $x/y = 0.5$ to $2.0$.

Examples of structures of perfluoropolyether compounds, in cases where their chain structures are of KRYTOX and DEMNUM groups, include the following compounds 6 to 27.

$$F\text{—}(C_3F_6\text{—}O)_m\text{—}C_2F_4\text{—}CONH\text{—}C_2H_4\text{—}NH\text{—}C_3H_6\text{—}Si(CH_3)(O\text{—}CH_3)_2 \tag{Comp. 6}$$

$$F\text{—}(C_3F_6\text{—}O)_m\text{—}C_2F_4\text{—}CONH\text{—}C_2H_4\text{—}NH\text{—}C_3H_6\text{—}Si(O\text{—}CH_3)_3 \tag{Comp. 7}$$

$$F\text{—}(\text{—}C_3F_6\text{—}O\text{—})_m\text{—}C_2F_4\text{—}CONH\text{—}C_3H_6\text{—}Si(O\text{—}C_2H_5)_3 \tag{Comp. 8}$$

$$F\text{—}(\text{—}C_3F_6\text{—}O\text{—})_m\text{—}C_2F_4\text{—}COO\text{—}C_3H_6\text{—}O\text{—}C_3H_6\text{—}Si(O\text{—}CH_3)_3 \tag{Comp. 9}$$

$$F\text{—}(\text{—}C_3F_6\text{—}O\text{—})_m\text{—}C_2F_4\text{—}COO\text{—}CH(CH_3)\text{—}CH_2\text{—}O\text{—}C_3H_6\text{—}Si(O\text{—}CH_3)_3 \tag{Comp.10}$$

$$F\text{—}(\text{—}C_3F_6\text{—}O\text{—})_m\text{—}C_2F_4CH_2\text{—}O\text{—}C_3H_6\text{—}O\text{—}C_3H_6\text{—}Si(O\text{—}CH_3)_3 \tag{Comp.11}$$

$$F\text{—}(\text{—}C_3F_6\text{—}O\text{—})_m\text{—}C_2F_4\text{—}COO\text{—}C_3H_6\text{—}O\text{—}C_3H_6\text{—}Si(CH_3)(O\text{—}CH_3)_2 \tag{Comp.12}$$

$$F\text{—}(\text{—}C_3F_6\text{—}O\text{—})_m\text{—}C_2F_4\text{—}CH_2\text{—}O\text{—}CH(CH_3)\text{—}CH_2\text{—}O\text{—}C_3H_6\text{—}Si(CH_3)(O\text{—}CH_3)_2 \tag{Comp.13}$$

$$F\text{—}(\text{—}C_3F_6\text{—}O\text{—})_m\text{—}C_2F_4\text{—}CH_2\text{—}O\text{—}C_3H_6\text{—}Si(CH_3)(O\text{—}CH_3)_2 \tag{Comp.14}$$

$$F\text{—}(\text{—}C_3F_6\text{—}O\text{—})_m\text{—}C_2F_4\text{—}CH_2\text{—}O\text{—}C_3H_6\text{—}Si(O\text{—}CH_3)_3 \tag{Comp.15}$$

$$F\text{—}(\text{—}C_3F_6\text{—}O\text{—})_m\text{—}C_2F_4\text{—}COO\text{—}C_3H_6\text{—}Si(O\text{—}CH_3)_3 \tag{Comp.16}$$

$$F\text{—}(\text{—}CF(CF_3)\text{—}CF_2\text{—}O\text{—})_n\text{—}CF(CF_3)\,CONH\text{—}C_2H_4\text{—}NH\text{—}C_3H_6\text{—}Si(CH_3)(O\text{—}CH_3)_2 \tag{Comp.17}$$

$$F\text{—}(\text{—}CF(CF_3)\text{—}CF_2\text{—}O\text{—})_n\text{—}CF(CF_3)\text{—}CONH\text{—}C_2H_4\text{—}NH\text{-}C_3H_6\text{—}Si(O\text{—}CH_3)_3 \tag{Comp.18}$$

$$F\text{—}(\text{—}CF(CF_3)\text{—}CF_2\text{—}O\text{—})_n\text{—}CF(CF_3)\text{—}CONH\text{—}C_3H_6\text{—}Si(O\text{—}C_2H_5)_3 \tag{Comp.19}$$

$$F\text{—}(\text{—}CF(CF_3)\text{—}CF_2\text{—}O\text{—})_n\text{—}CF(CF_3)\text{—}COO\text{—}C_3H_6\text{—}O\text{—}C_3H_6\text{—}Si(O\text{—}CH_3)_3 \tag{Comp.20}$$

$$F\text{—}(\text{—}CF(CF_3)\text{—}CF_2\text{—}O\text{—})_n\text{—}CF(CF_3)\text{—}COO\text{—}CH(\text{—}CH_3)\text{—}CH_2\text{—}O\text{—}C_3H_6\text{—}Si(O\text{—}CH_3)_3 \tag{Comp.21}$$

$$F\text{—}(\text{—}CF(CF_3)\text{—}CF_2\text{—}O\text{—})_n\text{—}CF(CF_3)\text{—}CH_2\text{—}O\text{—}C_3H_6\text{—}O\text{—}C_3H_6\text{—}Si(O\text{—}CH_3)_3 \tag{Comp.22}$$

$$F\text{—}(\text{—}CF(CF_3)\text{—}CF_2\text{—}O\text{—})_n\text{—}CF(CF_3)\text{—}COO\text{—}C_3H_6\text{—}O\text{—}C_3H_6\text{—}Si(CH_3)(O\text{—}CH_3)_2 \tag{Comp.23}$$

$$F\text{—}(\text{—}CF(CF_3)\text{—}CF_2\text{—}O\text{—})_n\text{—}CF(CF_3)\text{—}CH_2\text{—}O\text{—}CH(CH_3)\text{—}CH_2\text{—}O\text{—}C_3H_6\text{—}Si(CH_3)(O\text{—}CH_3)_2 \tag{Comp.24}$$

$$F\text{—}(\text{—}CF(CF_3)\text{—}CF_2\text{—}O\text{—})_n\text{—}CF(CF_3)\text{—}CH_2\text{—}O\text{—}C_3H_6\text{—}Si(CH_3)(O\text{—}CH_3)_2 \tag{Comp.25}$$

$$F\text{—}(\text{—}CF(CF_3)\text{—}CF_2\text{—}O\text{—})\text{—}CF(CF_3)\text{—}CH_2\text{—}O\text{—}C_3H_6\text{—}Si(O\text{—}CH_3)_3 \tag{Comp.26}$$

$$F\text{—}(\text{—}CF(CF_3)\text{—}CF_2\text{—}O\text{—})\text{—}CF(CF_3)\text{—}COO\text{—}C_3H_6\text{—}Si(O\text{—}CH_3)_3 \tag{Comp.27}$$

where, $m=14$ in average, and $n=24$ in average.

Specific examples of the perfluoropolyether compounds in case their chain structures are of FOMBLIN include the following structures.

$$A\text{—}CF_2\text{—}\{\text{—}(\text{—}CF_2\text{—}CF_2\text{—}O\text{—})_x\text{—}(CF_2\text{—}O\text{—})_y\text{—}\}\text{—}CF_2\text{—}A \tag{Comp.28}$$

$$B\text{—}CF_2\text{—}\{\text{—}(\text{—}CF_2\text{—}CF_2\text{—}O\text{—})_x\text{—}(CF_2\text{—}O\text{—})_y\text{—}\}\text{—}CF_2\text{—}B \tag{Comp.29}$$

wherein, A is $\text{—}CONH\text{—}CH_2CH_2CH_2\text{—}Si\text{—}(\text{—}OCH_2CH_3)_3$, B is $\text{—}CH_2O\text{—}CH_2CH_2CH_2\text{—}Si\text{—}(\text{—}OCH_3)_3$, $x=21$ in average, and $y=27$ in average.

KRYTOX group: $F(CF(CF_3)\text{—}CF_2\text{—}O\text{—})_n\text{—}CF(CF_3)\text{—}Z\text{—}B$, DEMNUM group: $F(CF_2\text{—}CF_2\text{—}CF_2\text{—}O)_n\text{—}CF_2\text{—}CF_2\text{—}Z\text{—}B$, FOMBLIN group: $B\text{—}Z\text{—}C_2F_4\text{—}O\text{—}\{(CF_2\text{—}CF_2\text{—}O)_x\text{—}(CF_2\text{—}O)_y\}\text{—}C_2F_4\text{—}Z\text{—}B$, wherein n is an integer equal to 11 or greater, $x+y \geq 18$, $x/y = 0.5$ to $2.0$, Z is a connection group which includes an alkylane or amino group which contains at least one of amide, ester and methylenoxide. B is remaining group of alkoxy silane.

Examples of structures of perfluoropolyether compounds in case their chain structures have a KRYTOX and a DEMNUM group include the following compounds.

$$F(\text{—}CF_2\text{—}CF_2\text{—}CF_2\text{—}O\text{—})\text{—}C_2F_4\text{—}CONH\text{—}C_3H_6\text{—}Si\,(CH_3)(O\text{—}CH_3)_2 \tag{Comp. 33}$$

$$F(\text{—}CF(CF_3)\text{—}CF_2\text{—}O\text{—})\text{—}CF(CF_3)\text{—}CONH\text{—}C_2H_4\text{—}NH\text{—}C_3H_6\text{—}Si(CH_3)(O\text{—}CH_3)_2 \tag{Comp. 34}$$

$$F(\text{—}CF(CF_3)\text{—}CF_2\text{—}O\text{—})\text{—}CF(CF_3)\text{—}CONH\text{—}C_2H_4\text{—}NH\text{—}C_3H_6\text{—}Si(O\text{—}CH_3)_3 \tag{Comp. 35}$$

$$F(\text{—}CF(CF_3)\text{—}CF_2\text{—}O\text{—})_p\text{—}CF(CF_3)\text{—}CONH\text{—}C_3H_6\text{—}Si(O\text{—}C_2H_5)_3 \tag{Comp. 36}.$$

Examples of structures of perfluoropolyether compounds in case their chain length structures have a FOMBLIN group include the following structures 37 to 40.

$$C\text{—}C_2F_4\text{—}O\text{—}\{(CF_2\text{—}CF_2\text{—}O)_x\text{—}(CF_2\text{—}O)_y\}\text{—}C_2F_4\text{—}C \tag{Comp.37}$$

(Comp. 38)

(Comp. 39)

(Comp. 40)

where, C is —CONH—$CH_2CH_2CH_2$—Si(—$OCH_2CH_3$)$_3$, D is —$CH_2O$—$CH_2CH_2CH_2$—Si(—$OCH_3$)$_3$ x=21 in average, y=27 in average, j=8 in average, and k=10 in average.

All of the perfluoropolyether compounds shown in compounds 6 to 40 dissolve in perfluorohexane or perfluorobutylmethylether which is a kind of solvent having some fluorine atoms. The solvent is expressed as fluorine solvent in this paper. In order to form a film of either one of the above-mentioned perfluoropolyether compounds on the surface of the fuel injection valve, the fuel injection valve is immersed into a solution having the perfluoropolyether compounds dissolved into the fluorine solvent such as perfluorohexane or perfluoromethylether or the like. Alternatively, the solution is dripped on the nozzle portion of the fuel injection valve. Then, they are heated at 150° C. for 10 minutes. By heat treatment described above, alkoxysilane which is at the terminal group of perfluoropolyether compounds 6 to 40 is caused to react with a hydroxyl group present on the surface of the fuel injection valve to bind together. By a simple process as described above, a reaction film of the perfluoropolyether compound can be formed on the surface of the fuel injection valve according to the invention. A thickness of a film to be formed thereon depends on a molecular weight and a concentration of coating of the perfluoropolyether compounds. Thermal stabilities and oxidation stabilities of respective reaction films obtained as above are found to have been improved. However, compounds 9, 10, 12, 16, 20, 21, 23 and 27 wherein their binding group is ester are slightly inferior in these stabilities compared with the other perfluoropolyether compounds of the invention.

A most preferable method for stably bonding the perfluoropolyether compounds 6 to 40 on the surface of the substrate is to use alkoxy silane as a reaction group. However, it is not limited thereto, and alkoxy titanium or akloxy zirconium may be used as well.

When there does not exist an adequate oxide film which provides for a reaction site with respect to compounds 6–40 on the surface of the fuel injection valve for the gasoline direct injection engine, it is necessary to provide for an organic polymer film or oxide film as a bonding (or binding) acceleration (promotion) layer. This bonding acceleration layer is required to have such properties as to be able easily to form a hydrate at its reaction site on the surface, to have a strong adhesion with the surface of the fuel injection valve, and to be ensured to exist stably at 5–12 MPa of fuel pressures, at 150–200° C. on the surface of the fuel injection valve, and in a stringent environment of gasoline combustion. As organic polymeric films that can be used enduring such stringent environments, there are a thermo-set film of a ladder type silicone group origomer, an epoxy resin cured film and the like. As oxide films, there are $SiO_2$, $Al_2O_3$, $TiO_2$ or the like. On either one of these bonding accelerators provided as above, perfluoropolyether compound 6–40 is reaction-bonded firmly so as to accomplish the fuel injection valve which can eliminate the accumulation of deposits according to the invention. It should be noted, however, that when the thickness of the bonding acceleration film increases excessively, a strain is caused to occur between the fuel injection valve and the bonding acceleration film due to a difference in their thermal expansion coefficients, thereby resulting in a peel-off of the bonding accelerator film. Therefore, the thickness of the bonding accelerator film is preferably as thin as possible.

Specific examples of the ladder type silicone group oligomers used as the bonding accelerator include glass resin GR100, GR650, GR908, GR950 available from SHOWA DENKO, LTD. Well-known examples of such epoxy resins include Epicoat Series of Yuka Shell Epoxy KK, XD9053 of Dow Chemical Japan KK, and the like. As oxide films for the bonding acceleration, a baked film of various metal alkoxides, aluminum chelte reagents and the like are used. Specific examples of metal alkoxides include tetraethoxysilane (SHINETSU KAGAKU KOGYO K.K.: KBE04), tetromethoxysilane (SHINETSU KAGAKU KOGYO K.K.: KBM04), tetraethoxytitane (DINAMITE NOBEL JAPAN K.K.: ET), tetramethoxytitan (DINAMITE NOBEL JAPAN K.K.: MT), tetrapthoxytitan (DINAMITE NOBEL JAPAN K.K.: BT) and the like. As the alminum chelete reagent, there is alminum chelete A available from Kawa-Ken Fine Chemical K.K.

A fuel injection valve according to one aspect of the invention is provided with at least one of the following features that an organic film of a 1.5 nm to 8 nm thickness is provided on the port and in the vicinity of the fuel injection port, or on the surface of the fuel injection valve, that the fuel injection valve has an opening from 0.3 mm to 0.8 mm diameter capable of atomizing fuel into particles in less than 20 μm in diameter, and that the fuel injection valve port and its vicinity are manufactured using a ferrite stainless steel comprising of C from 0.6 to 1.5%, Si less than 1%, Mn less than 1.5%, and Cr from 15 to 20% by weight. The organic film which is comprised of any one of the above-mentioned compounds is bonded with its base metal by covalent binding, the thickness of which film is preferably 1.5–30 nm, more preferably 1.5–10 nm, and the most preferably 1.5–7 nm.

Further, as the organic film may be formed of using tetrafluoride-ethylene monomer by glow discharge. Other candidates of the organic film are Teflon resin, or a solution of metal alkoxide and fluoroalkyl group substituted alkoxide, and the like.

According to another aspect of the invention, a gasoline direct injection engine is provided, which is comprised of a cylinder head having air intake means and exhaust means connected to the combustion chamber, a piston reciprocating within the cylinder, fuel injection means for injecting fuel into the combustion chamber, and ignition means for igniting atomized fuel, and wherein said fuel injection means is comprised of the above-mentioned fuel injection valve.

According to still another aspect of the invention, a gasoline direct injection engine is provided, wherein the same is comprised of a cylinder head having air intake means and exhaust means connected to the combustion chamber, a piston reciprocating within the cylinder, fuel injection means for injecting fuel into the combustion chamber, and ignition means for igniting atomized fuel, and wherein the surfaces of an injection port and its vicinity of said fuel injection are coated with an organic film.

DESCRIPTION OF THE PREFERRED EMBODIMENTS

EMBODIMENT 1

Figure 1:
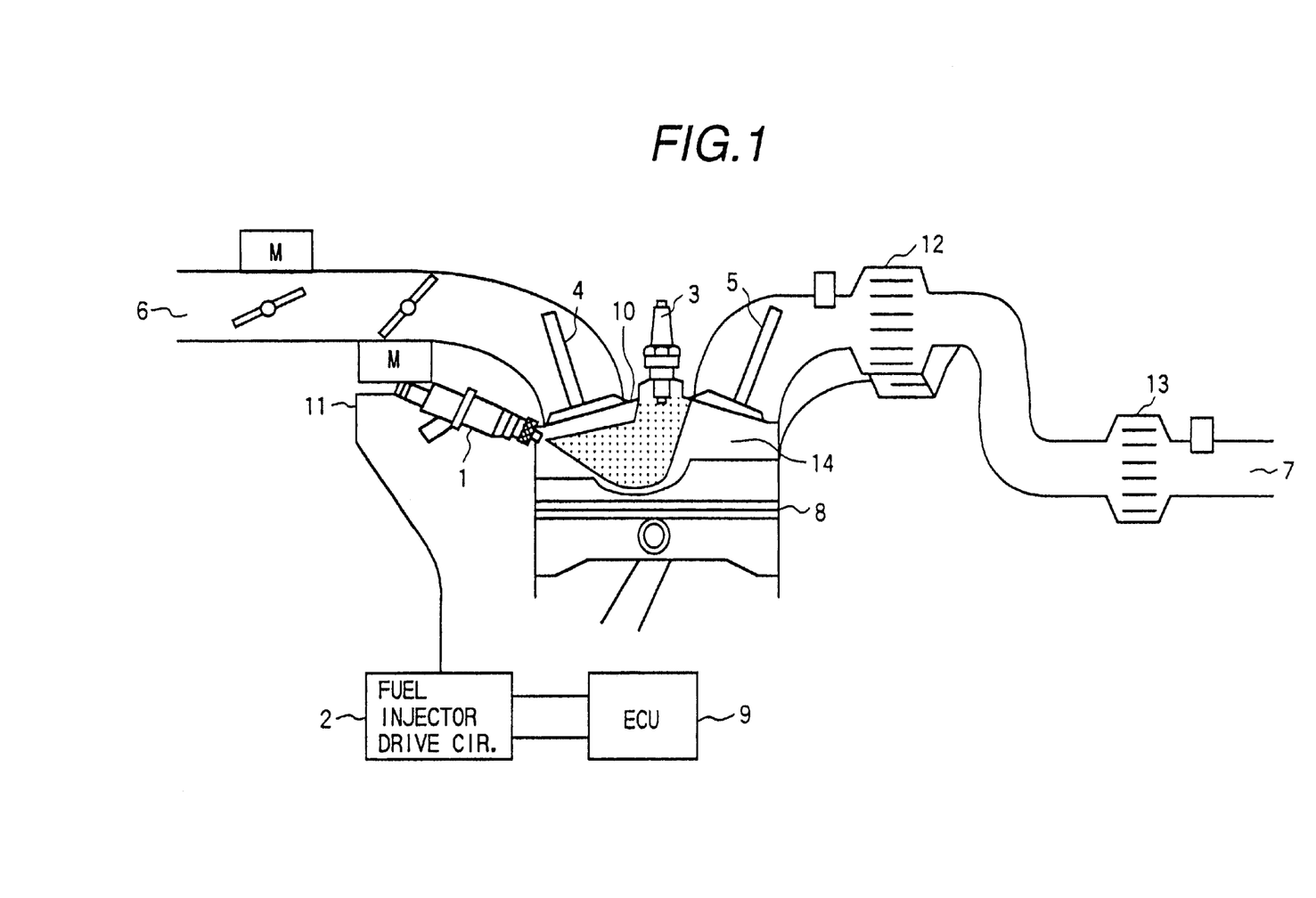
FIG. 1 is a schematic diagram of a gasoline direct injection engine according to the invention.

FIG. 1 shows a gasoline direct injection type internal combustion engine for automobile according to one embodiment of the invention. A fuel injection valve 1 which is mounted on a cylinder head 10 has an opening at its end portion for directly injecting fuel supplied from a fuel gallery into a combustion chamber 14.

An ignition plug 3 which is provided between an intake valve 4 and an exhaust valve 5 ignites a mixture of air and fuel to start combustion, the air being supplied from intake port 6 and through intake valve 4 by moving of piston 8, and the fuel injected from injection valve 1. An exhaust gas after combustion is exhausted through exhaust valve 5 by moving of piston 8 while it is open.

An injection valve moving signal terminal 11 of fuel injection valve 1 is electrically connected to a fuel injection valve moving circuit 2. Further, the fuel injection valve moving circuit 2 is electrically connected to an electronic control unit (ECU) 9 which emits a fuel injection valve moving trigger signal and a signal whether or not to move the fuel injection valve in such a manner as to minimize an operation delay of the valve body. By way of example, ECU 9, which is supplied with data representing various operational conditions of the engine, determines a fuel injection valve moving trigger signal in response to the operational conditions.

An air flow from intake port 6 is controlled by electromagnetic means M which is provided dually and operates with the motion of an accelerator pedal. Hydrocarbon, carbon monoxide, and NOx, which are included in the exhaust gas after combustion, are removed by a low oxygen storage type three-way catalyst 12 and a lean NOx catalyst 13. In this embodiment 1 of the invention, a particle size of atomized fuel injected from the fuel injection valve 1 is less than 25 $\mu$m, preferably less than 15 $\mu$m, and more preferably less than 10 $\mu$m, and whereby a super lean-burn with an air fuel ratio of 50 is realized. In the three-way catalyst 12, Pt or Ce is supported by alumina supports. In NOx catalyst 13, Pt is supported by alumina supports, or oxides of Na, Ti are supported therein.

Figure 2:
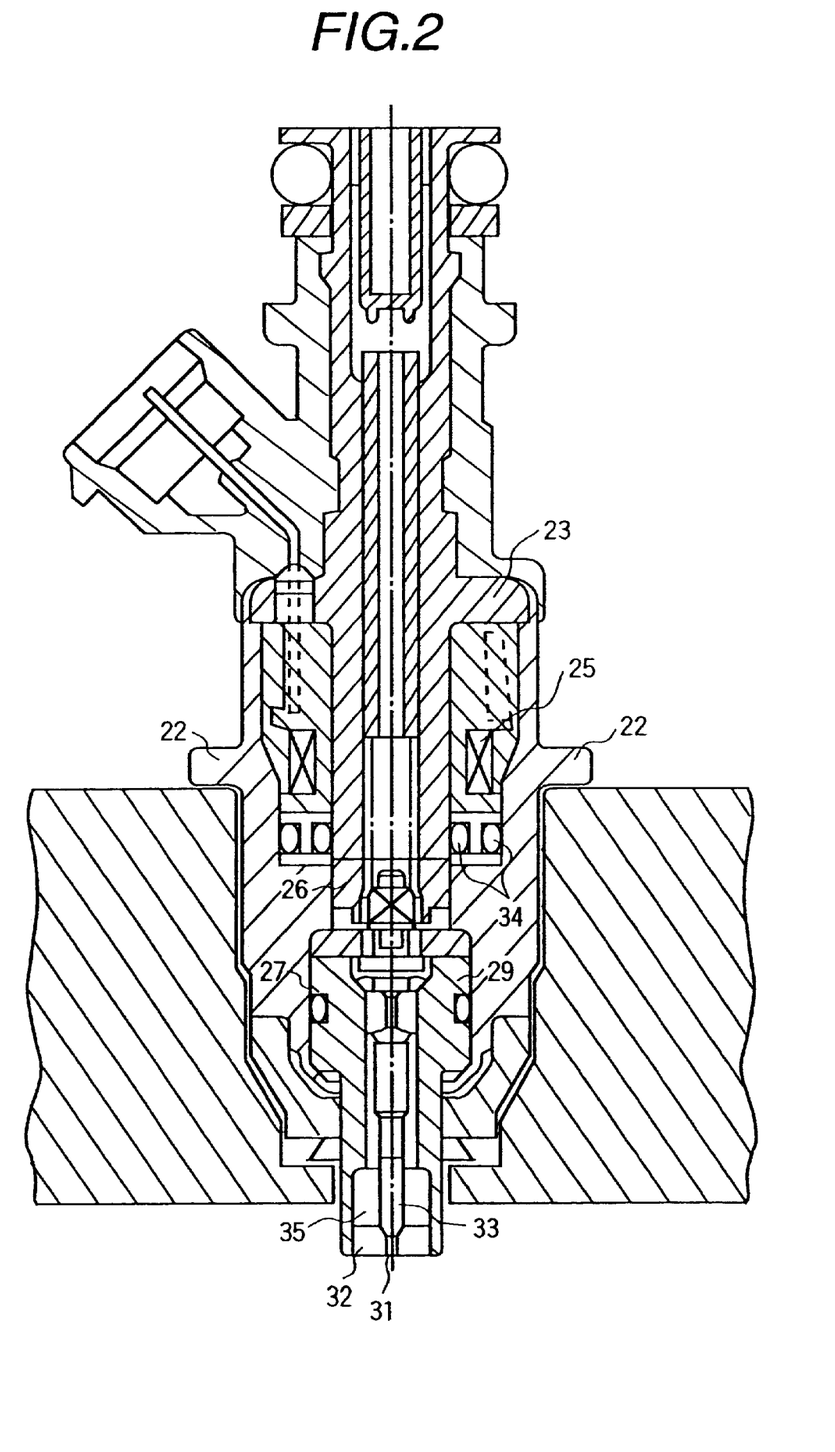
FIG. 2 is a schematic diagram of a fuel injection valve according to the invention.

With reference to FIG. 2, a schematic view of a cross-section of fuel injection valve 1 of the invention is shown, which is mounted in the cylinder head 10. In FIG. 2, numeral 22 depicts a housing; 23 depicts a core; 25 a coil; 26 an armature; 27 a valve unit; wherein valve unit 27 is supported by one end of the housing 22 by caulked joint. Further, valve unit 27 is comprised of: a valve body 29 which is a step-wise hollow cylinder having a minor diameter cylinder portion and a major diameter cylinder portion; a valve sheet 32 which is firmly fixed to the end of a center port inside the valve body 29, and has a fuel injection port 31; and a needle valve 33 which is operated by a solenoid device to contact and separate from valve sheet 32 to open and close fuel injection port 31. Numeral 34 indicates a space in contact with a bottom surface of the coil assembly and surrounded by the housing and the core, which more specifically corresponds to a pair of O-rings disposed on the side of fuel pressure application. Numeral 35 depicts a swirler. A diameter of the fuel injection valve port 31 is 0.8 mm.

Now, the operation of the fuel injection valve will be described. When coil 25 is given an electronic signal, a magnetic flux is produced in the magnetic circuit including armature 26, core 23 and housing 22, whereby armature 26 is attracted toward core 23, thereby separating needle valve 33 which is integral with armature 26 from valve sheet 32 so as to provide for a gap therebetween. Then, a pressurized fuel is guided from valve body 29 through the gap into injection port 31 in the valve sheet 32 so as to be injected therefrom as atomized particles as described above.

Further, the fuel injection valve 1 is mounted so as to protrude into the cylinder as much as 2–10 mm.

In particular, valve body 29, valve sheet 32, needle valve 33 and swirler 35 are manufactured using 1 wt % of C and 16 wt % of Cr containing ferrite stainless steel of JIS Standard SUS44C, which is cold-processed, annealed, and machined into final shapes. The diameter of injection valve port 31 is 0.8 mm, and a roundness at its minor diameter is less than 0.5 $\mu$m.

A method for forming a coating of perfluoropolyether compounds at the end portion of fuel injection valve 1, and its effect and advantage will be described in the following.

Perfluoropolyether compounds such as Compound 8 having numerical average molecular weight of 2690, Compound 19 having numerical average molecular weight of 2190, Compound 39 having numerical average molecular weight of 2302 are dissolved in perfluorohexane of FC-72 (Trade name; Sumitomo 3M K.K.) to produce a solution of 0.2 wt % concentration. The nozzle end portion of the fuel injection valve of FIG. 2 is immersed into this solution for one hour. Then, the fuel injection valve taken out from the solution is heated at 150° C. for 10 minutes. By this heat treatment, alkoxy silane which is a terminal functional group of perfluoropolyether compounds of Compounds 8, 19, 37 is caused to have a dehydration reaction with a hydroxyl group on the surface of the fuel injection valve, whereby the both of them undergo a covalence binding to form a highly adhesive coating approximately of 2 nm thickness. This coating is provided on the whole area of the internal surface of swirler 35, the whole area of needle valve 33 corresponding to the swirler, on the valve sheet 32, on the fuel injection port 31, and on the valve body 29 corresponding to the part of the swirler. The fuel injection valves after treatment by the perfluoropolyether compounds of 8, 19 and 37 are mounted on a test engine to observe accumulation of deposits. Gasoline flow reduction rates are measured as an index of a quantity of deposits. The test engine used is a gasoline direct injection four-cycle, V-type/6 cylinder engine (Nissan Motors). Water of 80° C. is circulated in the engine head to keep the temperature of the engine head at 90–110° C. Test were conducted at engine rotation of 1200 rpm, fuel flow rate at 2200 cc/h and for 40 hours of operation.

Figure 3:
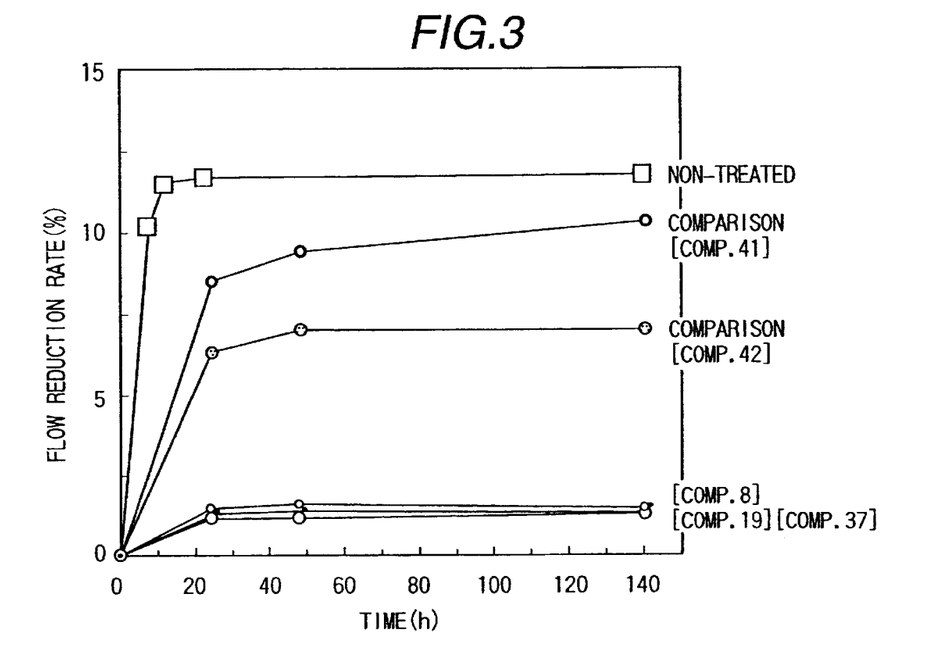
FIG. 3 shows a relationship between operation times (h) and fuel flow reduction rates (%) of the embodiments of the invention treated by perfluoropolyether compounds.

In reference to FIG. 3, a relationship between the operation time and the decrease in the fuel flow rate is shown for respective cases of the fuel injection valve where its surface is treated by perfluoropolyether compounds 8, 19 and 37, respectively. Comparison examples shown here include non-treated one the surface of which is not treated with any perfluoropolyether compound, and those which are treated with the following fluoroalkyl compounds 41 and 42 in 0.2 wt % concentration, respectively.

(Comp. 41), (Comp. 42).

With reference to FIG. 3, in respective cases where the surfaces are treated with compounds 8, 19 or 37 respectively, their fuel flow decreasing rates are suppressed to be less than 2%, which is substantially smaller than the cases treated with comparison examples 41, 42 and the non-treated one. This result reveals that when the surface is treated with the perfluoropolyether compounds, a flow resistance due to accumulation of deposits becomes substantially small, thereby showing an excellent effect to prevent accumulation of the deposits.

EMBODIMENT 2

Figure 4:
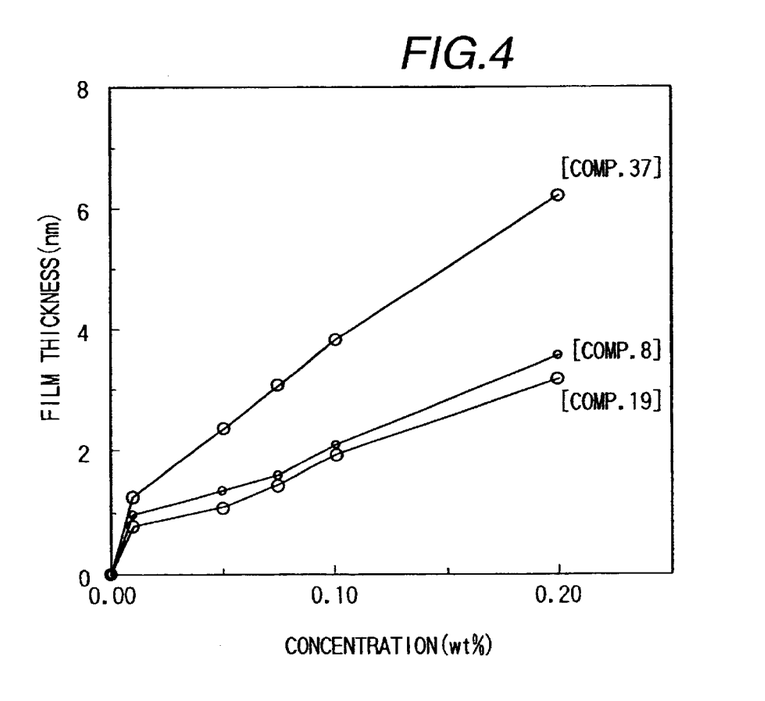
FIG. 4 shows a relationship between concentrations and film thicknesses of the perfluoropolyether compounds according to the invention.

Solutions of respective perfluoropolyether compounds 8 with numeral average molecule weight of 2690, 19 with numeral average molecule weight of 2190 and 37 with numeral average molecule weight of 4880 are prepared by dissolving these compounds into perfluorohexane of FC-72 (Trade name: Sumitomo 3M K.K.) in 0.01, 0.05, 0.075, 0.1 and 0.2 wt % concentrations, respectively. Into these solutions, the nozzle portion of the fuel injection valve shown in FIG. 2 is immersed for one hour. Then, the valve hauling up from the solution is heated at 150° C. for ten minutes. Through such heat treatment, alkoxy silane which is the terminal functional group of the perfluoropolyether compounds 8, 19 and 37 is caused to have a dehydration reaction with the hydroxyl group present on the surface of the fuel injection valve, whereby both of them are allowed to have a covalence binding to form a coating film of approximately 2 nm thick. The thickness of the films of the perfluoropolyether compounds firmly coated on the surface of the fuel injection valve was measured by the reflection adsorption spectroscopy (RAS) method using an infrared spectroscopy 1720 of Perkin-Elmer. In the measurement of thickness, spectra of 1250–1275 $cm_{-1}$ in stretching vibration of C—F which is the main structure of perfluoropolyether were used, and its absorption was converted to a film thickness. The film thickness was calibrated using ellipsometry. A relationship between concentrations of coating and film thicknesses for each of the perfluoropolyether compounds 8, 19 and 37 is shown in FIG. 4. Reaction-bonded film thicknesses of the perfluoropolyether compounds 8, 19 and 37 were in the range of 0.8 nm to 6.2 nm. A fuel injection valve treated with perfluoropolyether compound 8 was mounted on the test engine, and its deposit accumulation condition was observed. A gasoline flow reduction was measured as an index of a quantity of accumulation of deposits. The test engine used was a direct injection 4-cycle, V-type/6 cylinder engine manufactured by Nissan Motor Co., and the temperature of its engine head was controlled at 90–110° C. by circulating water of 80° C. in the engine head. The test was done at 1200 rpm, with a fuel flow of 2200 cc/h, and for 40 hours of operation.

Figure 5:
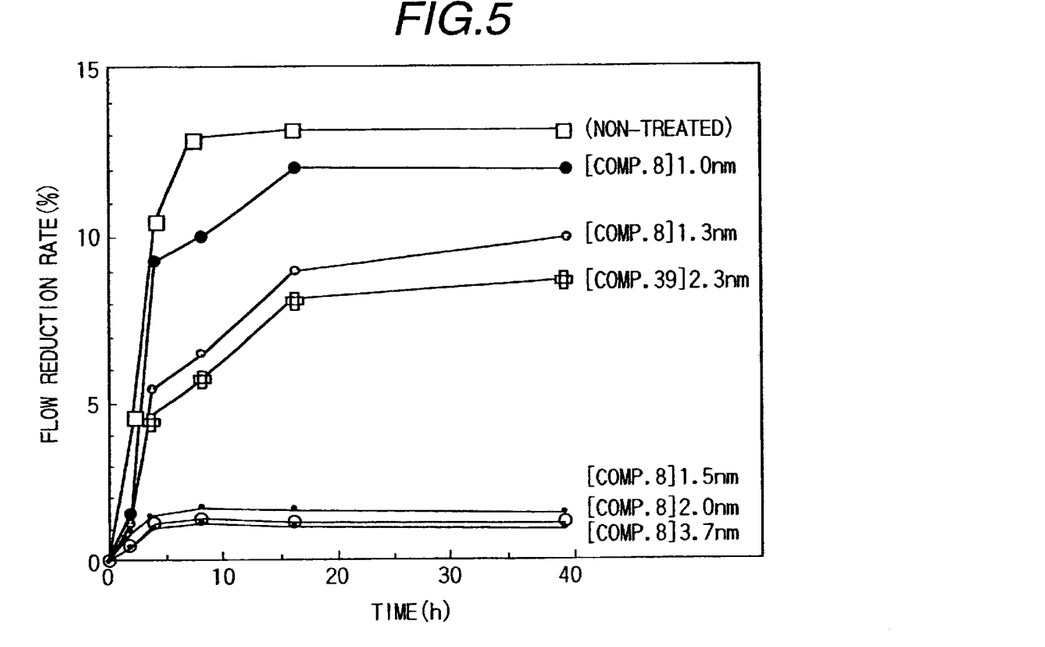
FIG. 5 is a diagram showing flow reduction rates of respective fuel injection valves of embodiments of the invention and comparison examples.

With reference to FIG. 5, decreases in fuel flow rates relative to times of operation are shown for respective cases where the perfluoropolyether compound 8 was coated on the surface in 0.01, 0.05, 0.075, 0.1 and 0.2 wt % concentrations, respectively. Film thicknesses coated were 1.0, 1.3, 1.5, 2.0 and 3.7 nm, respectively, and each contact angle for water is more than 100 degrees. Comparison examples used include non-treated one the surface of which was not treated with any perfluoropolyether compound, and another one the surface of which was coated with the fluoroalkyl compound of 41 in 0.2 wt % concentration. Film thickness measurements of the fluoroalkyl compound were conducted using the infrared spectroscopy type 1720 of Perkin-Elmer, and by the reflection adsorption spectroscopy (RAS) method. In this measurements, spectra of 1200 $cm_{-1}$ in the stretching vibration of C—F which is the main structure of the fluoroalkyl compound were used, and its film thickness was obtained by conversion from its absorption. The film thickness was calibrated using the ellipsometry. The thickness of compound 41 treated was 2.3 nm.

It is known from FIG. 5 that in the case where the surface is treated with compound 8 to have a film thickness of 1.5 nm or more, a decrease in its fuel flow rate is suppressed to be less than 2%, which is substantially smaller than the cases where the surface is treated with comparison compound 41 in a film thickness of 2.3 nm, and the non-treated example. This result reveals that when the surface is treated with the perfluoropolyether compound 8 to have the film thickness more than 1.5 nm, any substantial flow resistance due to accumulation of the deposits does not occur thereby proving its excellent advantage and effect to be able to prevent deposition of the deposits. Further, observation of deposit accumulation after 40 hours of operation on the injection port 3 of the fuel injection valve which was treated with the perfluoropolyether compound of the invention in the thickness more than 1.5 nm revealed that its deposit accumulation was remarkably smaller compared with the comparison examples.

EMBODIMENT 3

Perfluoropolyether compounds of the invention: compound 8 with numeral average molecular weight of 2690; compound 19 with numeral average molecular weight of 2190; compound 37 with numeral average molecular weight of 4880;

and compound 38 with numeral average molecular weight of 4820, are dissolved respectively into perfluorobutylmethylether HFE7100 (Trade name: Sumitomo 3M K.K.) to prepare a solution thereof in 0.2 wt % concentration. In the same manner as with the Embodiment 1, a fuel injection valve as shown in FIG. 2 is immersed in this solution for one hour so as to form a coating comprising the perfluoropolyether compound of the invention on the surfaces of the fuel injection valve and the injection port. Then, the fuel injection valve unit is hauled up from the solution, and heated at 150° C. for ten minutes. A film thickness of the perfluoropolyether compound which is reaction-bonded on the fuel injection valve was measured using the infrared spectroscopy 1720 type from Perkin-Elmer, and by the RAS method. Spectra of 1250–1270 $cm^{-1}$ in the stretching vibration of C—F which is the main composition of the perfluoropolyether were used in the measurements, and its film thickness is obtained by conversion from its absorption. The film thickness is calibrated using the elliptometry. Film thicknesses reaction-bonded on the surface of the fuel injection valve are 3.6 nm for the compound 8, 3.2 nm for the compound 19, 5.8 nm for the compound 37, and 5.9 nm for the compound 38, respectively. Contact angles for water are more than 100 degrees, respectively.

In addition, comparison examples were prepared using the following fluoroalkyl compounds of compounds 41- 46, as well as perfluoropolyether compounds of compounds 45, 46, which are dissolved into perfluorobutylmethylether HFE7100 (Trade Name of Sumitomo 3M K.K.) to produce each solution thereof in 0.5 wt % concentration. Into this solution, the nozzle end portion of a fuel injection valve as shown in FIG. 2 is immersed for one hour. Then, the same is hauled up from the solution, and heated at 150° C. for ten minutes. In this manner the coating thereof is reaction-bonded on the fuel injection valve. Molecular weights of compounds 41–46 are 510, 218, 390, 610, 1860 and 1530, respectively. Film thicknesses of reaction-bonded compounds bound on the surface of the fuel injection valve are 18.9 nm with compound 41, 38.2 nm with compound 42, 32.8 nm with compound 43, 10.8 nm with compound 44, 42.6 nm with compound 45, and 40.2 nm with compound 46, respectively. Contact angles for water were more than 100 degrees for all cases.

---

Compound 43: $(CF_3)_2CFO—C_3H_6—Si(OC_2H_5)_3$
(molecular weight: 390)
Compound 44: $F(CF_2)_8—C_2H_4—Si(OC_2H_5)_3$
(molecular weight: 610)
Compound 45: $F(—CF_2—CF_2—CF_2—O—)_m—C_2F_4—CONH—C_3H_6—Si(OC_2H_5)_3$
(m = 9 in average)
(average molecular weight: 1860)

-continued

Compound 46: F(—CF(CF$_3$)—CF$_2$O—)$_m$—CF(CF$_3$)—CONH—C$_3$H$_6$—Si(O—C$_2$H$_5$)$_3$
(m = 7 in average)
(average molecular weight: 1530).

The fuel injection valves the surface of which are treated with either of the perfluoropolyether compounds of 8, 19, 37 and 38, the fluoroalkyl compounds of 41–44, and the perfluoropolyether compounds of 45 and 46 according to the invention were mounted on the test engine to observe the state of accumulation of the deposits and to measure respective decreases in the fuel flow rates as indices representing a quantity of the deposits accumulated. The test engine used is a direct injection 4-cycle, V-type/6-cylinder engine manufactured by Nissan Motors Co. Water is circulated at 80° C. through the engine head to keep the temperature of the engine head at 90–110° C. The test was done at 1200 rpm, and the fuel flow rate at 2200 cc/h. The test duration time was set for 140 hours.

Figure 6:
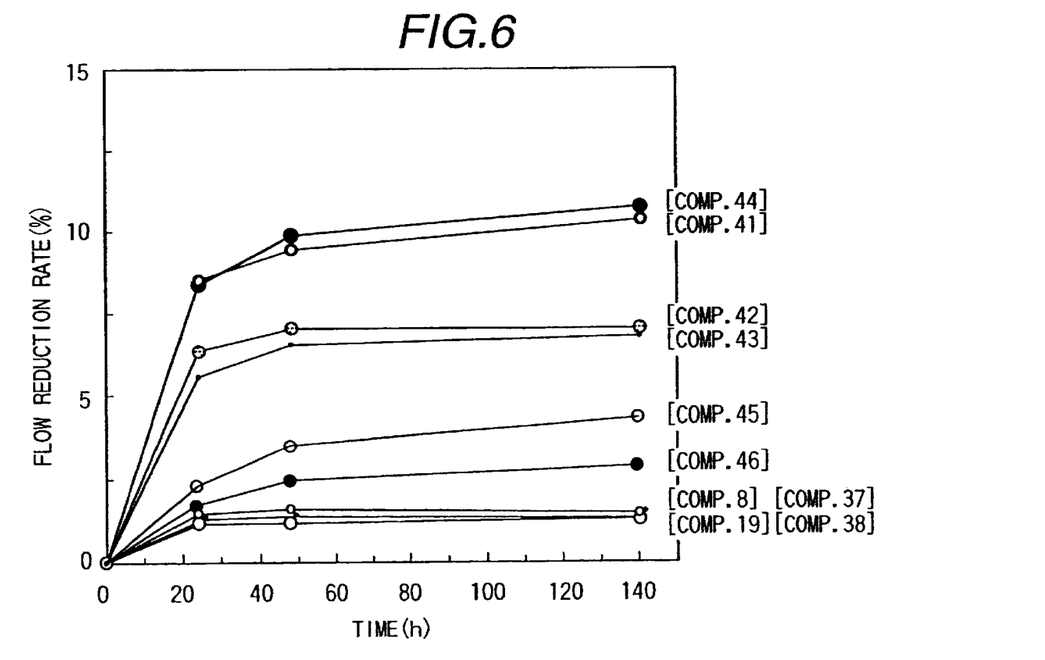
FIG. 6 is another diagram showing flow reduction rates of respective fuel injection valves of embodiments of the invention and comparison examples.

With reference to FIG. 6, when the perfluoropolyether compound having numeral average molecular weight greater than 2190 is reaction-bonded on the surface in a thickness of 2.3 nm or more, the decrease in the fuel flow rate is confirmed to be suppressed less than 2%, which is remarkably smaller than the cases where the surface is treated with the fluoroalkyl compounds of the comparison examples having molecular weights of 218–610 with 10.8–38.2 nm thickness. Further, in the case of the perfluoropolyether compounds having a molecular weight less than 1860, even if its film thickness is thick as 40.2 or 42.6 nm, the decrease in the flow rate due to occurrence of the deposits is observed to become 3–5%. Although its effect is recognized, the effect is not sufficient. It is concluded from the result of the tests that in the case where the perfluoropolyether compound having a numeral average molecular weight greater than 2190 is used, a film thickness of 1.5 nm or more can adequately prevent accumulation of the deposits, however, that in the case where the fluoroalkyl compound with a smaller molecular weight is used, even if its film thickness is given sufficiently thick, a substantial occurrence of the deposits cannot be prevented. Further, with the perfluoropolyether compounds having molecular weights of 1530 and 1860, a sufficient effect could not have been obtained.

EMBODIMENT 4

A solution of glass resin GR100 manufactured by Showa-Denko Co. is prepared by dissolving the same into methyl ethyl keton in 0.02 wt % concentration. Into this solution, a fuel injection valve the leading end of which is chrome-plated is immersed so as to coat the surfaces of the fuel injection valve and the injection port with glass resin GR100. Then, the fuel injection valve is hauled up from the solution, heated at 200° C. for 30 minutes, thereby baking the coating of glass resin GR100 on the surfaces of the fuel injection valve and its injection port. Then, compound 6 having a molecular weight of 2670 is dissolved into perfluorobutylmethylether HFE7100 (Trade Name of Sumitomo 3M K.K.) to produce a solution thereof with 0.2wt % concentration. The above-mentioned fuel injection valve which is baked on its surface with the coating of glass resin GR100 is immersed into this solution for one hour. Then, the fuel injection valve, after hauling up from the solution is heated at 150° C. for ten minutes. In this manner, thin layers of glass resin GR100 and the compound 6 are formed on the surfaces of the fuel injection valve and its internal injection port. A film thickness of the compound 6 was 3.2 nm and a contact angle for water on the surface of the fuel injection valve was greater than 100 degrees.

As a comparison example, a fuel injection valve the end portion of which is chrome-plated is immersed in the solution of compound 6 with 0.2 wt % concentration thereof (solvent used: perfluorobutylmethylether HFE7100 (trade name of Sumitomo 3M K.K.)) for one hour, after hauling up from the solution, heated at 150° C. for ten minutes. A film thickness of the comparison example using compound 6 was measured using the RAS method to be 1.1 nm thick. A contact angle for water is less than 100 degrees. This fuel injection valve was mounted on the test engine, and a state of accumulation of the deposits thereon was observed, and measurements of the decreases in the fuel flow rates as an index which represents a quantity of deposits were conducted. The engine used for evaluation of the state of accumulation of the deposits is the direct injection 4-cycle, V-type/6-cylinder engine manufactured by Nissan Motors Co. Water is circulated through the engine head at 80° C. to maintain the temperature of the engine head from 90–110° C. The tests were done at 1200 rpm, 2200 cc/h of a fuel flow rate, and for 140 hours of operation.

Figure 7:
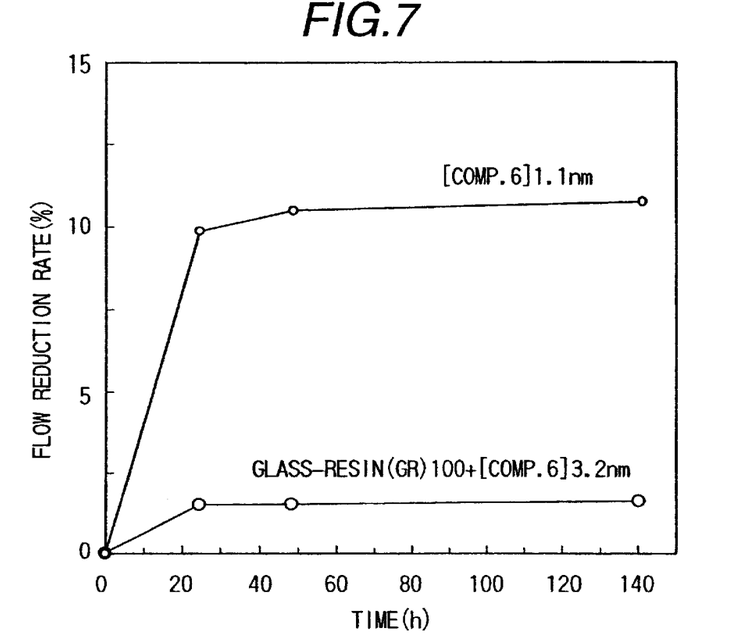
FIG. 7 is still another diagram showing flow reduction rates of respective fuel injection valves of an embodiment of the invention and a comparison example.

In reference to FIG. 7, the fuel injection valve the end portion of which is chrome-plated, and coated with both the layers of glass resin GR100 and compound 6 in combination features a thicker film layer of compound 6 compared with the comparison example the end portion of which is chrome-plated and coated with the layer of compound 6 alone, and a remarkably smaller decrease in the flow reduction rates. From this result, it is concluded that the organic polymeric layer of glass resin GR100 is very effective as the bonding acceleration layer.

EMBODIMENT 5

A solution [A] is prepared by dissolving 0.44 g of epoxy resin EP1004 (Yuka Shell Epoxy K.K.), 0.30 g of Malkalineka-M (Maruzen-Sekiyu-Kagaku K.K.) which is poly-p-hydroxy-styrene resin, and 0.004 g of triethylammoniumborate TEA-K (Hokko-kagagu K.K.) which is a hardening accelerator, into a mixture solvent of 95 g of methyl ethyl keton and 5 g of 2-butoxyethyl acetate. A fuel injection valve the end portion of which is chrome-plated is immersed in this solution [A] to provide for a coating of solution [A] on the surface of the fuel injection valve and on the internal wall of the injection port thereof. Then, the fuel injection valve is hauled up from the solution, heated at 200° C. for 30 minutes, so as to bake the layer of film comprising solution [A] on the surface of the injection valve and on the internal wall of the injection port thereof. Nextly, a solution of compound 6 having a molecular weight of 2670 is prepared by dissolving into perfluorobutylmethylether HFE7100 (Sumitomo 3M K.K.) with 0.2 wt % concentration thereof. Into this solution, the above-mentioned fuel injection valve the end portion of which is baked with the coating comprising solution [A] is immersed for one hour. Then, the fuel injection valve after hauling up from the solution is heated at 150° C. for ten minutes. In this way, thin layers of coating of glass resin GR100 and compound 6 are formed on the surface of the fuel injection valve and on the internal wall of the injection port thereof. A film thickness of compound 6 was 3.5 nm, and a contact angle for water on the surface of the fuel injection valve was more than 100 degrees.

A comparison example was prepared by immersing a fuel injection valve the leading edge portion of which was chrome-plated into a solution of compound 6 with 0.2 wt % concentration (solvent: perfluorobutylmethylether HFE7100

(Sumitomo 3M K.K.)) for one hour, then the same was hauled up from the solution, heated at 150° C. for ten minutes. A film thickness of compound 6 for the comparison example was measured using the RAS method to be 1.0 nm thick. Its contact angle for water is less than 100 degrees. This fuel injection valve was mounted on the test engine, and conditions of accumulation of deposits were observed, and decreases in the fuel flow rates, which are indices indicative of a quantity of accumulation of the deposits were measured. The test engine used in the evaluation of accumulation of the deposits is the direct injection 4-cycle, V-type 6-cylinder engine manufactured by Nissan Motors Co. Water is circulated through the engine head at 80° C. to keep the temperature of the engine head at 90–110° C. The tests were done at 1200 rpm, at 2200cc/h of fuel flow rate, and for 140 hours of operation.

Figure 8:
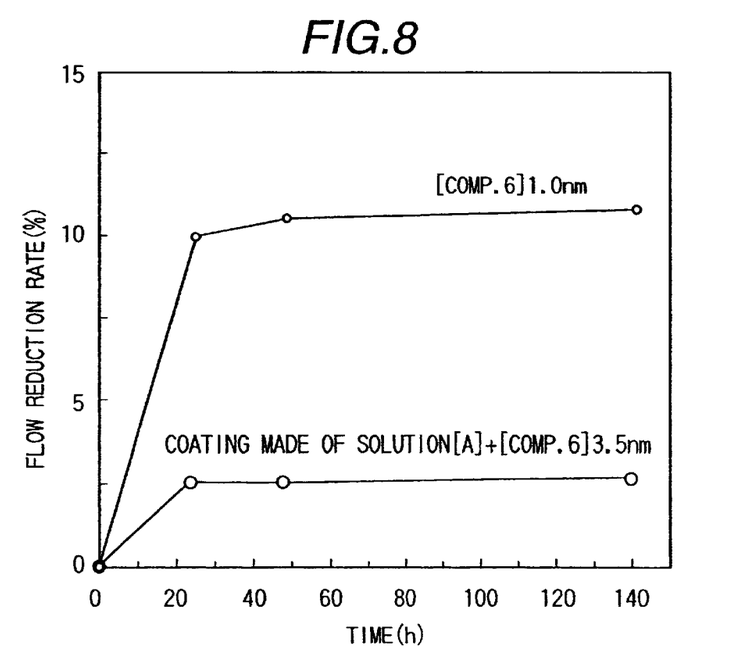
FIG. 8 is a diagram showing flow reduction rates of fuel injection valves of another embodiment of the invention and a comparison example.

As clearly shown in FIG. 8, the fuel injection valve the leading portion of which was chrome-plated, and coated with both layers of solution [A] and compound 6 is characterized by having a thicker coating of compound 6 and having an extremely smaller decrease in the flow reduction rates compared with another fuel injection valve which is chrome-plated and coated with compound 6 alone. From this result, it is concluded that the organic polymer layer of the invention is very effective as the bonding acceleration layer.

EMBODIMENT 6

A solution of tetraethoxy silane KBE04 (Shinetsu Kagagu-kogyo K.K.) of 0.05 wt % concentration was prepared by dissolving into methanol. Into this solution, a fuel injection nozzle the leading edge of which was chrome-plated was immersed. After hauling up from the solution, the fuel injection valve was heated at 250° C. for one hour to form a $SiO_2$ film on the surface of the fuel injection valve. Nextly, a solution of compound 26 with molecular weight of 4280 and of 0.2 wt % concentration was prepared by dissolving the same into perfluorobutylmethylether HFE7100 (Trade Name of Sumitomo 3M K.K.). The above-mentioned fuel injection valve on the surface of which the $SiO_2$ film was formed was immersed into this solution of compound 26 for one hour. Then, after taking out of the solution, the fuel injection valve is heated at 150° C. for ten minutes. In this way, thin films of oxides of tetraethoxy silane and of compound 26 were formed on the surface of the fuel injection valve and on the internal wall of the injection port thereof. A film thickness of compound 26 was measured using the RAS method to be 2.8 nm. A contact angle for water was greater than 100 degrees.

A comparison example was prepared by immersing a fuel injection valve, the leading edge of which was chrome-plated, into a solution of compound 26 of 0.2 wt % concentration (which uses a solvent of perfluorobutylmethylether HFE7100 of Sumitomo 3M K.K.) for one hour, then the fuel injection valve having been hauled up from the solution was heated at 150° C. for ten minutes. A film thickness of compound 26 of the comparison example was measured by the RAS method and found out to be 0.9 nm. A contact angle for water was less than 100 degrees. This fuel injection valve was mounted on the test engine to monitor the condition of accumulation of deposits and to measure a decrease in the gasoline flow rate as an index representing a quantity of deposits thereon. The test engine used was a direct injection 4-cycle, V-type 6-cylinder engine manufactured by Nissan Motors Co. By circulating water at 80° C. through the engine head, the temperature of the engine head was controlled at 90–110° C. The tests were done at 1200 rpm, 2200 cc/h of fuel flow, and for 140 hours of operation.

Figure 9:
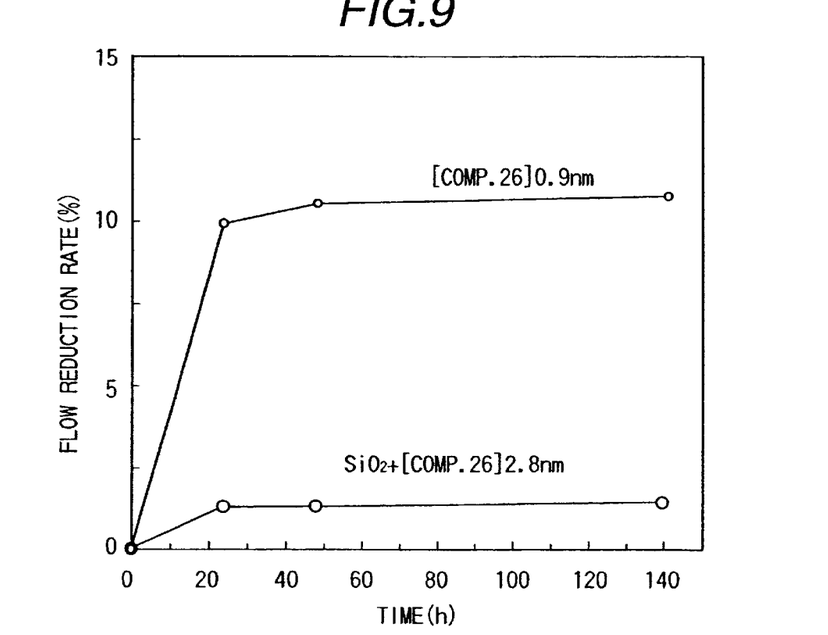
FIG. 9 is a diagram showing flow reduction rates of fuel injection valves of still another embodiment of the invention and a comparison example.

As clearly shown in FIG. 9, the fuel injection valve the leading edge portion of which was chrome-plated and coated by layers of both the tetraethoxy silane oxide and the compound 26 has a thicker film of compound 26 compared to the comparison fuel injection valve the edge portion of which was chrome-plated and coated by compound 26 alone, and thereby having a remarkably smaller decrease in the flow rate. From this result, it is concluded that the oxide film of the invention is very effective as the bonding acceleration layer.

EMBODIMENT 7

A solution of aluminum chelete A (Kawaken Fine Chemical K.K.) of 0.05 wt % concentration was prepared by dissolving into methanol. Into this solution, a fuel injection valve the edge portion of which was chrome-plated is immersed. After hauling up from the solution, this fuel injection valve is heated at 250° C. for one hour to form a film of $Al_2O_3$ on the surface thereof. Then, a solution of compound 37 with molecular weight of 4880 and in 0.2 wt % concentration is prepared by dissolving into perfluorobutylmethylether HFE7100 (Trade Name of Sumitomo 3M K.K.). Into this solution, the above-mentioned fuel injection valve coated with $Al_2O_3$ on the surface thereof is immersed for one hour. Then, after hauling up from the solution, the fuel injection valve is heated at 150° C. for ten minutes. In this way, both layers of a thin $Al_2O_3$ film and compound 37 are formed on the surface of the fuel injection valve and on the internal wall of the injection port thereof. A film thickness of compound 37 was measured using the RAS method and found out to be 3.2 nm thick. A contact angle for water was greater than 100 degrees.

A comparison example is prepared by immersing a fuel injection valve the edge portion of which was chrome-plated into a solution of compound 37 with 0.2 wt % concentration (which uses as its solvent perfluorobutylmethylether HFE7100 (Sumitomo 3M K.K.)) for one hour, and after taking out of the solution, heating at 150° C. for ten minutes. A film thickness of compound 37 on the comparison example was measured using the RAS method to be 0.9 nm. A contact angle for water is smaller than 100 degrees. These fuel injection valves were mounted on the test engine, and conditions of accumulation of deposits were monitored, and also measurements of decreases in the gasoline flow rates as indexes representing quantities of accumulation of deposits were conducted. The test engine used for evaluation of the conditions of accumulation of deposits is a direct injection 4-cycle, V-type 6-cylinder engine manufactured by Nissan Motors Co. By circulating water at 80° C. through the engine head, the temperature of the engine head was controlled at 90–110° C. The tests were done at 1200 rpm, 2200 cc/h fuel rate, and for 140 hours of operation.

Figure 10:
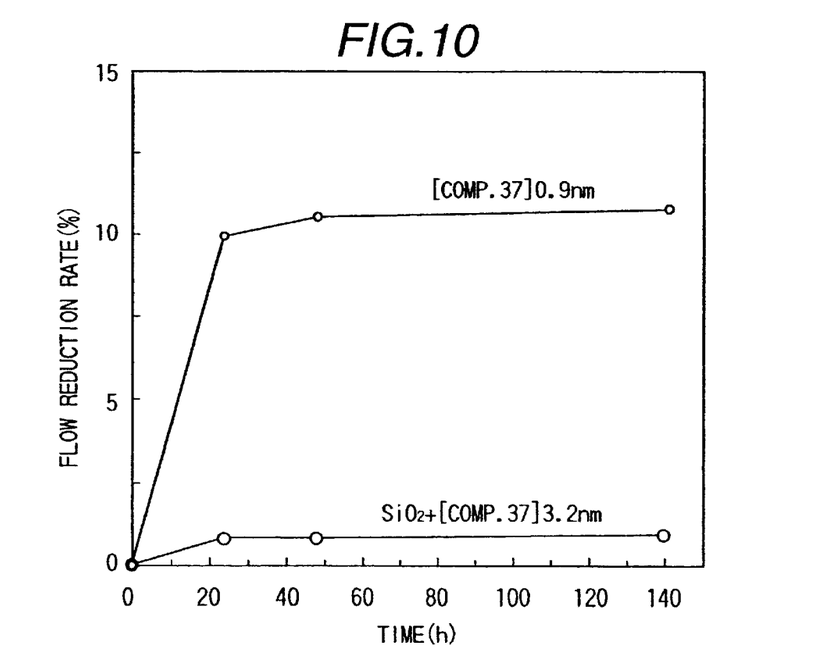
FIG. 10 is a diagram showing flow reduction rates of fuel injection valves of another embodiment of the invention and a comparison example.

As clearly shown in FIG. 10, the fuel injection valve the edge portion of which was chrome-plated and coated by both layers of $Al_2O_3$ film and compound 37 is characterized by having a thicker film of compound 37 compared to the comparison example which was chrome-plated and coated by compound 37 alone, thereby advantageously having a remarkably smaller decrease in the flow reduction rates. From the result, it can be concluded that the oxide film of the invention is very effective as the bonding acceleration layer.

EMBODIMENT 8

Figure 11:
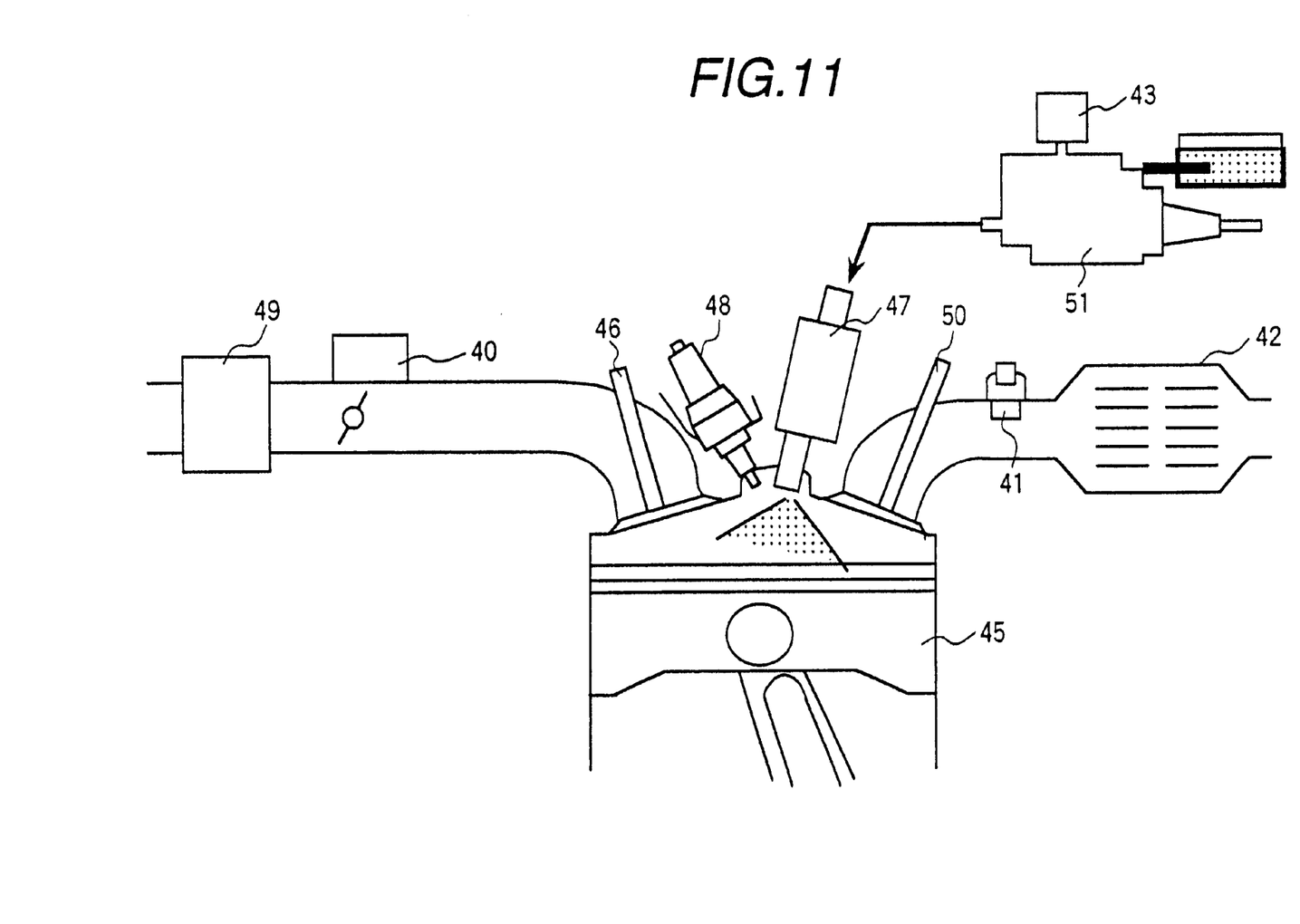
FIG. 11 is a schematic diagram of a gasoline direct injection engine according to another embodiment of the invention.

With reference to FIG. 11, a schematic block diagram of a direct injection engine according to another embodiment of the invention is shown. Embodiment 8 of the invention is comprised of: an air intake sensor 49; a throttle actuator 40; an ignition plug 48; a high pressure fuel injection valve 47 for directly injecting atomized fuel particles into a cylinder suitable of super lean burn combustion as in the embodiment 1; a high pressure fuel supply pump 51 for supplying fuel to the high pressure injection valve; an air/fuel ratio sensor 41; a catalyst 42; and a control unit 43, wherein the feature of the invention is characterized in a control method of the control unit 43 in an arrangement of the invention in which the high pressure injection valve 47 is provided in juxtaposition with ignition plug 48. The control unit 43 determines a combustion mode in response to an acceleration pedal operation and an engine speed by its combustion mode determination means. After calculation of a target air/fuel ratio by a target air/fuel ratio computing means in response to a combustion mode, a fuel injection quantity is computed by a fuel injection computing means. On the other hand, a throttle opening value is calculated by a throttle opening value computing means in response to the combustion mode.

With respect to numerals in FIG. 11, 46 depicts an air intake valve, 45 depicts a piston, 50 depicts an exhaust valve. Fuel injection valve 47 used here is the same as that of embodiment 1 as shown in FIG. 2, and a deposit accumulation prevention film of the invention is formed on its part and vicinity thereof to be exposed to a combustion gas, then, engine tests thereof were conducted in the same way as the other embodiments of the invention. A film thickness of its deposition prevention coating was set at approximately 2 nm. A flow reduction rate after 40 hours of operation for this embodiment was measured, and its flow reduction rate was found to be extremely small as small as 2%.

The following features have been accomplished according to the invention that the accumulation of deposits on the surface of the gasoline direct injection valve during combustion of gasoline can be prevented, and/or a gasoline direct injection valve which can easily remove the deposits accumulated thereon is provided, thereby ensuring optimization of a gasoline concentration and air flow specified in the engine cylinder for a long time of operation, enabling the super lean burn combustion control, and thereby providing automobiles with improved fuel mileage.

What is claimed is:

1. A fuel injector for direct-injection type internal combustion engine coated with a layer of film on the peripheral surface of its fuel injection port, wherein said layer is made of a reaction solidified layer of perfluoropolyether group compound having an alkoxy silane group.

2. A fuel injection valve according to claim 1, wherein said layer of perfluoropolyether group compound has a thickness in a range from 1.5 nm to 3.0 nm.

* * * * *